United States Patent [19]

Van Pelt et al.

[11] Patent Number: 4,953,044

[45] Date of Patent: Aug. 28, 1990

[54] CLOSED LOOP TAPE THREAD/UNTHREAD APPARATUS

[75] Inventors: Richard W. Van Pelt, Boulder; Patrick K. Wong, Louisville; Joseph W. Kern, Lafayette, all of Colo.

[73] Assignee: Storage Technology Corporation, Louisville, Colo.

[21] Appl. No.: 264,365

[22] Filed: Oct. 28, 1988

[51] Int. Cl.$^5$ ............................................. G11B 15/46
[52] U.S. Cl. .................................... 360/73.09; 360/71
[58] Field of Search ............... 360/69, 71, 72.3, 73.01, 360/73.03, 73.05, 73.06, 73.08, 73.11, 73.12, 73.14, 95; 242/195; 226/92; 318/6, 7

[56] References Cited

U.S. PATENT DOCUMENTS

| | | | |
|---|---|---|---|
| 3,932,889 | 1/1976 | Takeda et al. | 360/95 X |
| 4,477,851 | 10/1984 | Dalziel et al. | 360/95 |
| 4,644,436 | 2/1987 | Unno | 360/71 X |
| 4,742,407 | 5/1988 | Smith et al. | 360/95 |
| 4,788,606 | 11/1988 | Uchikaski | 360/73 |

FOREIGN PATENT DOCUMENTS

| | | | |
|---|---|---|---|
| 3818360 | 12/1988 | Fed. Rep. of Germany | 360/73.01 |
| 0284846 | 12/1986 | Japan | 360/73.01 |

*Primary Examiner*—Robert S. Tupper
*Assistant Examiner*—Andrew P. Sniezek
*Attorney, Agent, or Firm*—Dorr, Carson, Sloan & Peterson

[57] ABSTRACT

A tape threading arm mechanical linkage undergoes significant variations in mechanical advantage through its motion. In order to compensate for the drastic changes in the mechanical advantage of the tape threading arm, the operation of the tape threading arm is divided up into a plurality of control segments. Each segment represents a portion of the tape threading path wherein the mechanical advantage of the tape threading arm remains fairly constant. A control memory stores data indicative of various control parameters that are required to regulate the operation of the tape threading arm motor to maintain the tape speed throughout this segment of the tape threading path at a constant velocity. In addition, the measured velocity of the magnetic tape as it is removed from the file reel is used to compute the difference between the predicted operation of the tape threading arm and the measured operation of the tape threading arm. The difference between the expected and measured operations is used to generate feedback signals to vary the current in the tape threading arm motor and the file reel motor to maintain a constant tape velocity, tape tension and minimum torque load on the tape threading arm.

37 Claims, 3 Drawing Sheets

CLOSED LOOP TAPE THREAD/UNTHREAD APPARATUS

FIELD OF THE INVENTION

This invention relates to magnetic tape drives and, in particular, to a closed loop tape thread/unthread apparatus that regulates the operation of the tape thread arm and the file reel motor during the tape threading and unthreading operations.

PROBLEM

It is a problem in the field of tape drives to precisely control the operation of the tape threading arm during the tape thread and unthread process. In data processing systems, a typical data shortage media is a IBM 3480 magnetic tape cartridge. This magnetic tape cartridge consists of a single reel of magnetic tape enclosed in a housing. Data is read from this magnetic tape or written onto this magnetic tape by inserting the magnetic tape cartridge into a corresponding tape drive. The 4480 type tape drive contains a take-up reel and a tape threading arm. The magnetic tape that is stored on the file reel in the 4480 type magnetic tape cartridge contains a leader block that is attached to one end of the magnetic tape stored on the magnetic tape cartridge. The tape threading arm of the tape drive grasps the leader block once the 4480 type of magnetic tape cartridge is inserted into the tape drive in order to remove the end of the magnetic tape from the magnetic tape cartridge.

The tape threading arm consists of a mechanical linkage that is attached to a tape threading arm motor. The tape threading arm motor drives the mechanical linkage which has an effective radius or mechanical advantage that varies throughout its motion. The tape threading arm follows a predefined tape threading path through the tape drive to transport the leader block and the magnetic tape attached thereto over a plurality of guides past the read and write heads of the tape drive to a take-up reel. The tape threading arm inserts the leader block at the end of the above-described tape threading path into a retaining slot in the take-up reel. The take-up reel is driven by a take-up reel motor that operates in conjunction with a file reel motor to transport the magnetic tape from the file reel to the take-up reel at a predetermined velocity and tape tension. A difficulty with this arrangement is that, in existing tape drives, the tape threading and unthreading operation is an open loop process. The file reel motor is activated once the tape threading arm grasps the leader block in the tape threading operation in order to provide sufficient magnetic tape at the proper velocity for the tape threading arm to transport the leader block and its connected magnetic tape through the tape threading path. The velocity of the leader block and the connected magnetic tape varies throughout the length of the tape threading path due to the fact that the mechanical linkage of the tape threading arm does not transport the leader block at a constant velocity. In an open loop control system, the tape tension must then vary considerably to keep the file reel speed equal to the varying thread block speed. Tension variation causes tape stress, especially if slack is created when tension goes to zero.

SOLUTION

The above-described problems are solved and a technical advance achieved in the field by the closed loop tape thread/unthread apparatus. This apparatus measures the actual position and velocity of the magnetic tape on the file reel. This magnetic tape position and velocity are determined by measuring the output from an incremental encoder that is coupled to the file reel motor. Magnetic tape position and velocity information obtained from the incremental encoder on the file reel motor is used to generate control signals to concurrently regulate the drive current that is applied to the file reel motor and the drive current that is applied to the tape threading arm motor. Thus, the file reel motor and the tape threading arm motor are cooperatively operative to smoothly thread or unthread the magnetic tape from the file reel to the take-up reel with controlled tape speed, tape tension and minimum torque load on the tape threading arm.

The radius of the magnetic tape on the file reel remains nearly constant during the tape threading operation so that the magnetic tape static tension is directly proportional to the torque of the file reel motor which in turn is proportional to the current through the file reel motor. Thus, by holding the current in the file reel motor nearly constant during the tape threading operation, a constant tape tension can be maintained during the tape threading operation. The tape threading arm mechanical linkage undergoes significant variations in mechanical advantage through its motion. In order to compensate for the drastic changes in the mechanical advantage of the tape threading arm, the operation of the tape threading arm is divided up into a plurality of control segments. Each segment represents a portion of the tape threading path wherein the mechanical advantage of the tape threading arm remains fairly constant. A control memory stores data indicative of various control parameters that are required to regulate the operation of the tape threading arm motor to maintain the tape speed throughout this segment of the tape threading path at a constant velocity. In addition, the measured velocity of the magnetic tape as it is removed from the file reel is used to compute the difference between the predicted operation of the tape threading arm and the measured operation of the tape threading arm. The difference between the expected and measured operations is used to generate feedback signals to vary the current in the tape threading arm motor and the file reel motor to maintain a constant tape velocity, tape tension and minimum torque load on the tape threading arm. The operation of the tape threading arm is thereby significantly improved by dividing up the tape threading path into a plurality of segments, each of which has associated therewith distinct control parameters relating to the variation in the mechanical advantage of the tape threading arm, and by providing a closed loop feedback system that compares the predicted operation of the tape threading arm with the measured operation, and finally by controlling both the tape threading arm motor and the file reel motor in synchronization.

DETAILED DESCRIPTION OF THE DRAWING

In data processing systems, a typical data storage medium is the 4480 type magnetic tape cartridge. This magnetic tape cartridge is inserted into the corresponding tape drive mechanism that is used to read and write data on this magnetic tape cartridge, which tape drive mechanism is illustrated in perspective view in FIGS. 2 and 3. The 4480 type magnetic tape cartridge (not shown) consists of a single file reel of magnetic tape that rotates about a spindle. The reel of magnetic tape is enclosed in a protective housing that isolates the magnetic tape on reel from environmental contamination. The magnetic tape that is wound on the file reel of the magnetic tape cartridge has connected to one end thereof a leader block (not shown) that is accessible through an aperture in one end of the magnetic tape cartridge. The spindle of the magnetic tape cartridge comes in contact with file reel motor 121 of the tape drive when the magnetic tape cartridge is inserted into the tape cartridge elevator mechanism 134. File reel motor 121 is a bidirectional motor that can rotate the file reel in the magnetic tape cartridge in either the clockwise or counterclockwise direction to unwind or wind the magnetic tape onto the file reel, respectively. Included in file reel motor 121 is an incremental encoder 125 that provides a signal output indicative of the number of rotations of the file reel. Thus, incremental encoder 125 provides data that can be used to measure both the velocity of the magnetic tape as it is wound or unwound on the file reel as well as a cumulative position of the magnetic tape. The cumulative position of the magnetic tape as the term is used herein is an indication of the length of magnetic tape that has been unwound from the file reel.

Figure 2:
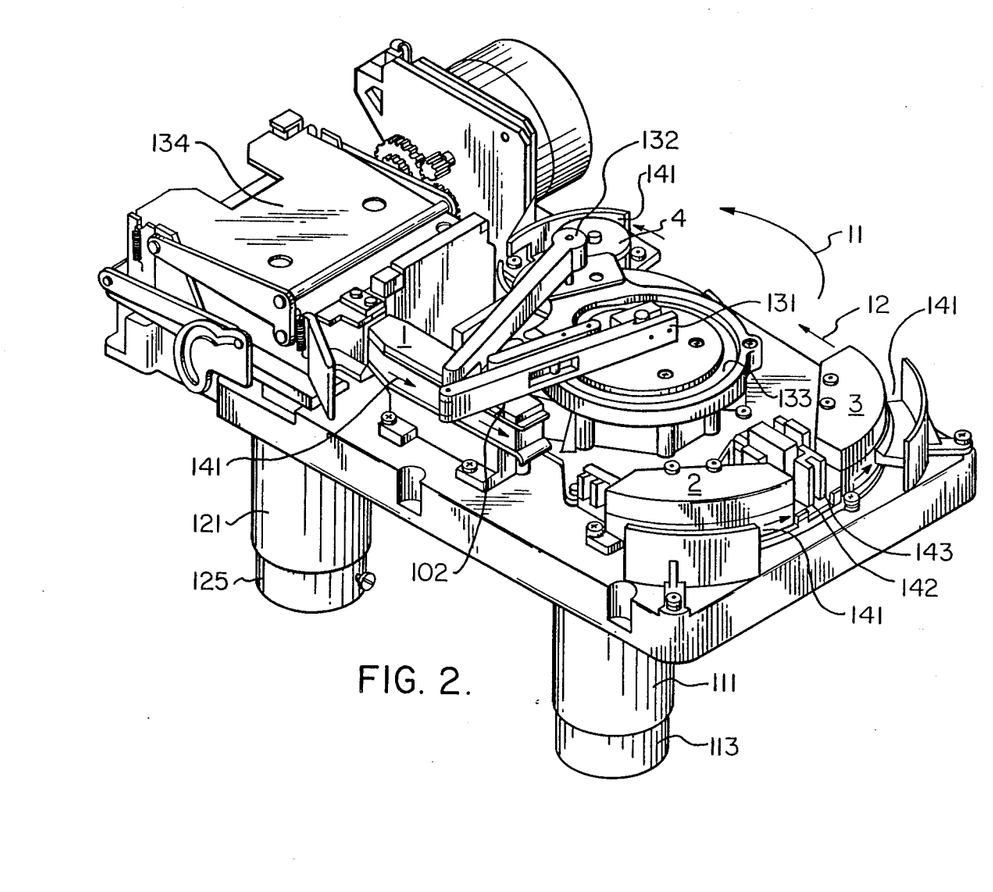
FIGS. 2 and 3 illustrate perspective views of a typical tape drive mechanism.
Figure 3:
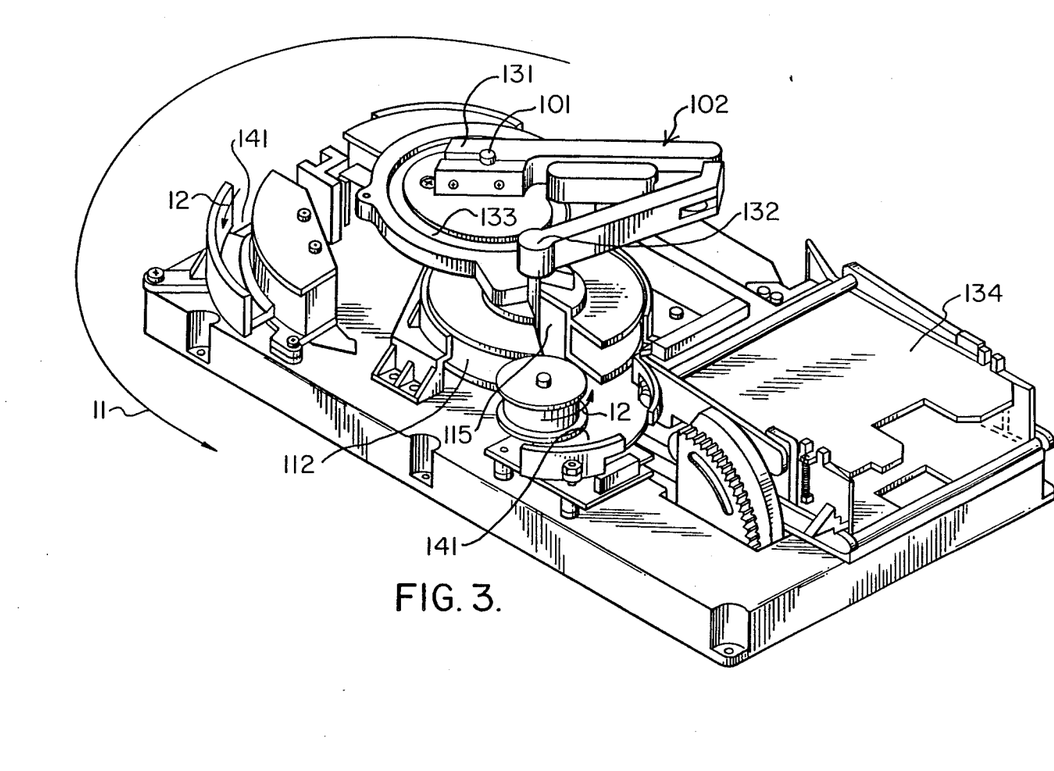

The tape drive includes a take-up reel 112 that is used to store the magnetic tape as it is unwound from the file reel. Take-up reel 112 includes a spindle (not shown) that is connected to a take-up motor 111 that is used to drive take-up reel 112 in a clockwise or counterclockwise direction to unwind/wind the magnetic tape, respectively. Take-up motor 111 includes an incremental encoder 113 that provides a signal output indicative of the number of revolutions of the take-up reel spindle.

The magnetic tape is connected to take-up reel 112 by the use of tape threading arm 102. Tape threading arm 102 consists of a plurality of mechanical linkages pivotally interconnected and driven by tape threading arm motor 101 the shaft end of which is shown in FIG. 3 to follow cam path 133. The body of tape threading arm motor 101 is located below the surface that includes cam path 133. One end 131 of tape threading arm 102 is connected to tape threading arm motor 101 which is a bidirectional motor that can drive tape threading arm 102 to thread the magnetic tape from the file reel to take-up reel 112 or to unthread the magnetic tape from take-up reel 112 to the file reel. The opposite end 132 of tape threading arm 102 engages the leader block via the aperture in the magnetic tape cartridge. Once this end 132 of tape threading arm 102 engages the leader block, tape threading arm motor 101 is activated to transport the leader block along tape threading path 141 to be placed in tape threading slot 115 in take-up reel 112.

As can be seen from the apparatus illustrated in FIGS. 2 and 3, the tape threading path 141 is a complex path wherein the magnetic tape is threaded in the direction of arrows 12 over guides 1–4 past write head 142 and read head 143 before the leader block is inserted in tape threading slot 115 on take-up reel 112. The complex nature of tape threading path 141 necessitates the use of tape threading arm 102 that consists of a plurality of pivotally interconnected mechanical linkages that pivot in the direction of arrows 11. The difficulty with the use of a plurality of pivotally interconnected mechanical linkages is that the effective radius or mechanical advantage of the tape threading arm 102 varies throughout its motion. The variability of the mechanical advantage in a typical tape threading arm 102 is by a factor of approximately six to one. This variability causes a significant variation in the velocity of the magnetic tape as it is transported from the file reel to take-up reel 112 along tape threading path 141. This significant variation in magnetic tape velocity causes corresponding variability in the tension of the magnetic tape as it is removed from the file reel as well as significant torque loads on tape threading arm 102 due to the variation in the velocity of the magnetic tape and the tape tension.

Control Circuit

In order to minimize the stress on the tape threading arm 102, the typical tape drive provides an open loop tape threading arm motor drive signal that attempts to provide an approximately constant velocity for the end of the tape threading arm 102. The difficulty with this arrangement is that by using an open loop process and by controlling only the tape threading arm motor 101, only a moderate level of control can be exercised on the operation of tape threading arm 102. A significant amount of stress is applied to tape threading arm 102 due to the torque load on this arm caused by significant variations in the tape tension due to variability of the velocity of the magnetic tape. The control apparatus of FIG. 1 overcomes this limitation of existing tape drive systems by providing a closed loop tape thread/unthread apparatus that concurrently regulates the operation of tape threading arm motor 101 and file reel motor 121 using feedback that consists of the measurement of the difference between the expected velocity of the magnetic tape and the actual velocity of the magnetic tape as it is threaded or unthreaded onto take-up reel 112 by tape threading arm 102. During a tape threading operation, the radius of the magnetic tape on the file reel remains nearly constant since only a short length of tape from the file reel 122 is needed to traverse the tape threading path 141 during this operation. Therefore, the radius of the magnetic tape on the file reel does not significantly change during the tape threading operation and the static tension of the magnetic tape is directly proportional to the torque of file reel motor 121. The torque of file reel motor 121 is in turn proportional to the electric current through file reel motor 121. Thus, by maintaining a constant current through the file reel motor 121 during the tape threading operation, a constant motor torque is obtained which serves to maintain a constant tension on the magnetic tape during the tape threading operation.

Tape Threading Arm Control Parameters

Figure 1:
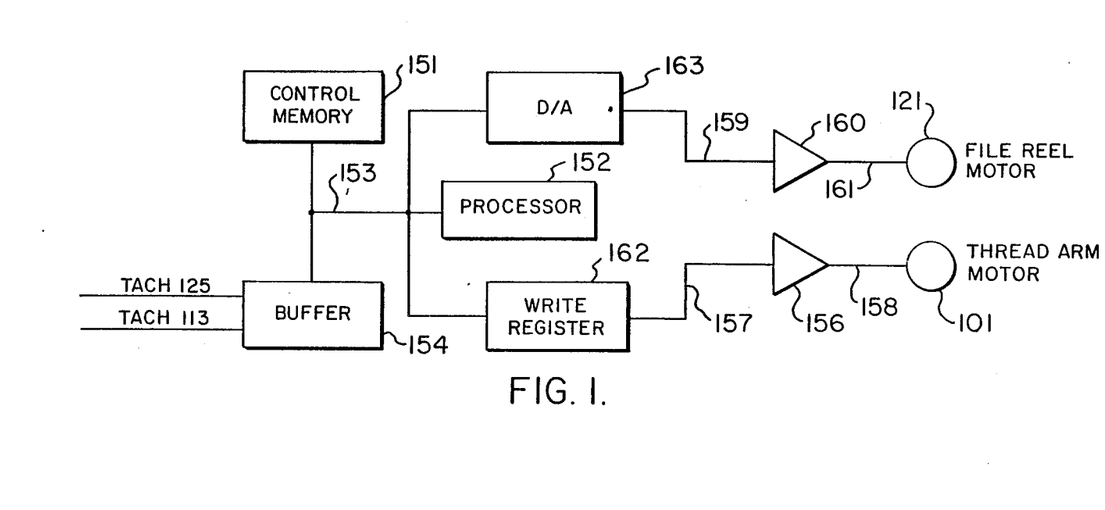
FIG. 1 illustrates the control circuit of the closed loop tape thread/unthread apparatus.
Figure 4:
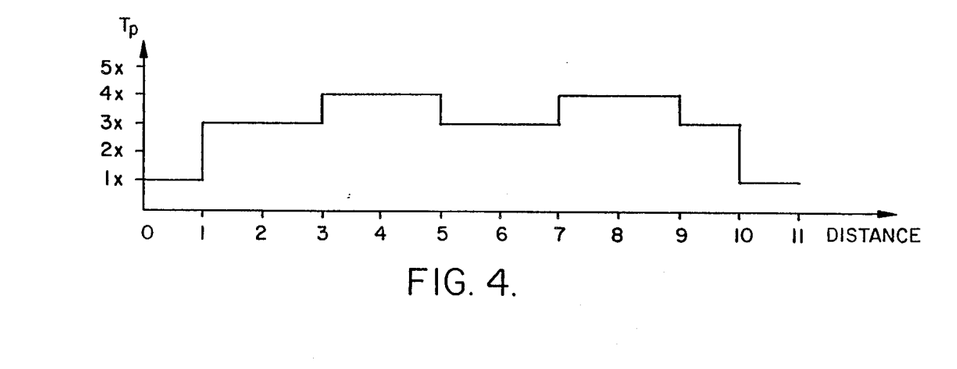
FIG. 4 illustrates a waveform of the multi-step control algorithm used to regulate the operation of the tape threading arm.

The velocity of the magnetic tape at the end of tape threading arm 102 is controlled by the control circuitry illustrated in FIG. 1. As can be seen from FIGS. 2 and 3, the complexity of tape threading path 141 and the plurality of pivotally interconnected mechanical linkages of tape threading arm 102 provide a significantly varying mechanical advantage throughout the tape threading operation. In order to control the velocity of the magnetic tape at the end of tape threading arm 102, the torque of tape threading arm motor 101 must be varied over a significant range. In order to accomplish this, tape threading path 141 is divided up into a plurality of segments, each of which corresponds to a fairly constant mechanical advantage of tape threading arm 102. Thus, each of these segments represents an interval during which the velocity of the magnetic tape can remain fairly constant due to a piecewise uniformity of tape threading path 141. The use of a plurality of segments to define tape threading path 141 essentially provides a piece-wise linear approximation of tape threading path 141. These segments that define tape threading path 141 are represented in control memory 151 by a set of control parameters for tape threading arm motor 101 for each of the plurality of segments of tape threading path 141. Thus, by varying the control parameters, for example Tp as shown in FIG. 4, for tape threading arm motor 101 during the various segments of tape threading path 141, the velocity of the magnetic tape can be maintained fairly constant. The incremental encoder 125 that is connected to file reel motor 121 is used to measure both the position of the leader block of the magnetic tape along tape threading path 141 as well as the velocity of the magnetic tape as it traverses tape threading path 141. The output of incremental encoder 125 is used by processor 152 to represent the points at which one segment of tape threading path 141 ends and a subsequent segment begins. Processor 152 reads the segment definition of tape threading path 141 from control memory 151 over bus 153. This segment definition includes tape position data indicative of the beginning of the segment, the end of the segment as well as the expected current required to drive tape threading arm motor 101 and the desired tape velocity for this segment of tape threading path 141. Processor 152 monitors the output of incremental encoder 125 to calculate the required control signals that are used to drive tape threading arm motor 101 and file reel motor 121. In particular, the following equation describes the current required for tape threading arm motor 101:

$$I = i + k(T_m - T_p)$$

In the above control algorithm, I is the amount of current that is applied to the tape threading arm motor 101 by driver 156 over lead 158. Processor 152 uses this algorithm to calculate the magnitude of the current that is required to drive tape threading arm 102 at the proper speed. This calculation is accomplished by reading from memory 151 the values of i, k and $T_p$ associated with this segment of the tape threading path 141. This data is stored in memory 151 for each of the plurality of segments of tape threading path 141. These stored values include i, which is the amount of current that is expected to be needed for this segment of tape threading path 141 to drive the threading arm motor 101 to produce sufficient torque to drive tape threading arm 102 at a constant velocity, which velocity matches the velocity of the magnetic tape as it is unreeled from the file reel. The variable k is the value of the gain that is required to provide adequate feedback for the operation of this system. The variable $T_p$ is the desired period, that is the number of clock cycles that are counted during one cycle of the incremental encoder of file reel motor 121. This desired period is essentially a measure of the velocity of the magnetic tape as measured by incremental encoder 125 which is attached to file reel motor 121. Thus, each of these three parameters is defined for each of the plurality of segments of tape threading path 141 and stored in memory 151. Processor 152 reads the data from memory 151 over bus 153, which data corresponds to the segment of tape threading path 141 in which the magnetic tape leader block is presently located. Processor 152 reads the incremental encoder count information from buffer 154 over bus 153 and uses this information to calculate the actual period $T_m$, which is an indication of the number of clock cycles in one cycle of the incremental encoder 125. The variable $T_m$ is a measure of the actual velocity of the magnetic tape along tape threading path 141. Processor 152 compares this measured magnetic tape velocity with the desired magnetic tape velocity $T_p$ that is read from memory 151. The difference between the actual and desired magnetic tape velocity is the calculated error in the magnetic tape velocity. Processor 152 multiplies this measured error by the constant k which is the feedback gain to calculate the amount of change in the drive current of tape threading arm motor 101 that is required to return the velocity of the magnetic tape to the desired velocity $T_p$. Processor 152 combines the terms in the equation indicative of the expected current and the correction to the current into a control signal which is supplied via register 162 and conductor 157 to drive amplifier 156. This resultant control signal is used by drive amplifier 156 to generate a drive current which is applied over conductor 158 to tape threading arm motor 101 to control the torque produced by tape threading arm motor 101.

Processor 152 is also connected by digital to analog converter 163 and conductor 159 to drive amplifier 160 which generates a drive current to control the operation of file reel motor 121. Thus, processor 152 applies a control signal via digital to analog converter 163 and conductor 159 to drive amplifier 160 to produce a constant current that is applied to file reel motor 121 to maintain a constant tape tension during the tape threading operation. If too great a discrepancy in the velocity of the magnetic tape is detected as described above, processor 152 can correct this discrepancy by also controlling the torque in use by file reel motor 121. This is accomplished by modifying the control signal that is transmitted over conductor 159 to drive amplifier 160. This modified control signal causes drive amplifier 160 to change the output current produced, thereby producing the corresponding change in the torque produced by file reel motor 121 since the torque produced by file reel motor 121 is directly proportional to the amount of drive current applied to file reel motor 121. In addition, since processor 152 controls both tape threading arm motor 101 and file reel motor 121, the velocity of the magnetic tape along tape threading path 141 can be modified for each segment of the tape drive path 141. Thus, the velocity of the magnetic tape along the initial and final segments of tape threading path 141 can be selected to be low while the intermediate segments of tape threading path 141 can be traversed at a significantly higher tape velocity. Therefore, processor 152 in response to the parameters stored in memory 151 can selectively control the velocity of the magnetic tape over each segment of the tape threading path 141. Since processor 152 concurrently regulates the operation of both tape threading arm motor 101 and file reel motor 121, the operation of these motors can be synchronized for any selected velocity of the magnetic tape.

Tape Unthreaded Operation

The technique described above is also used for the magnetic tape unthread operation. In the unthread operation, file reel motor 121 and its associated incremental encoder 125 are used to regulate the tape tension and to monitor the velocity of the magnetic tape respectively. The unthreading operation is the inverse of the threading operation. Tape threading arm 102 engages the leader block when the leader block is in the tape thread slot 115 of take-up reel 112 and the remainder of the magnetic tape is wound on the file reel. Tape threading arm 102 transports the leader block along tape threading path 141 in the reverse direction as that described above and deposits the leader block in the aperture of the magnetic tape cartridge at the end of the traverse of tape threading path 141. One important difference in the unthread operation is the use of the distance count from the incremental encoder 125. Processor 152 maintains a tally of the distance or length of tape that is spooled from the file reel to take-up reel 112 by counting the number of revolutions of incremental encoder 125. When the magnetic tape is rewound onto the file reel from take-up reel 112, processor 152 decrements the stored distance counts using the output of incremental encoder 125. In order to minimize the stress on tape threading arm 102 and the magnetic tape cartridge as tape thread arm 102 inserts the leader block into the aperture of the magnetic tape cartridge, the velocity of the magnetic tape is reduced to a minimal velocity. This control is accomplished when processor 152, using the distance count, determines that tape threading arm 102 is on the final segment of tape threading path 141 just before seating the leader block in the aperture of the magnetic tape cartridge. At this point, the output of incremental encoder 125 cannot be used for velocity information because file reel motor 121 is nearly stopped. To maintain speed control, processor 152 alternates the operation of tape threading arm motor 101 between drive, coast and dynamic brake. The dynamic brake operation is effective in limiting the speed of the tape threading arm 102 and the magnetic tape while the leader block is being seated in the aperture of the magnetic tape cartridge. Thus, the control circuitry illustrated in FIG. 1 can be customized to provide precise control of the velocity of the magnetic tape during the tape threading and unthreading operations. Each segment of the tape threading path 141 is individually programmable so that the velocity of the magnetic tape is selected to match the mechanical advantage of tape threading arm 102 for that particular segment of the tape threading path 141.

Head Cleaning Cartridges

This apparatus is also adaptable for use with various types of magnetic tape cartridges. For example, there are read and write head cleaning cartridges that are used in tape drives to remove dirt and oxide buildup on the tape threading path elements and the read and write heads. The magnetic tape cleaning cartridge has a file reel radius that is significantly smaller than the file reel radius of the standard 4480 magnetic tape cartridge. Since the cleaning cartridge uses a different type of tape than the standard magnetic tape data cartridge, and the radius of the file reel is significantly smaller, there is a much higher drag in the tape threading path 141. Therefore, the operation of the tape threading arm 102 must be modified to compensate for the higher drag and the speed of operation of file reel motor 121 must be modified to account for the different radius of the file reel. The control apparatus of FIG. 1 can accomplish this since the parameters used to control the velocity of the magnetic tape over the plurality of segments of tape threading path 141 allow the operation of tape threading arm 102 to be customized for each segment of the tape threading path 141 and for any type of magnetic tape cartridge 120 that is inserted in the tape drive. Therefore, the parameters i, k, $T_p$ can all be selected to match the physical requirements of the tape cleaning cartridge.

While a specific embodiment of this invention has been disclosed herein, it is expected that those skilled in the art can design other embodiments that differ from this particular embodiment but fall within the scope of the appended claims.

I claim:

1. In a tape drive having a take-up and a tape threading arm that transports a leader block, that is connected to magnetic tape on a magnetic tape file reel inserted into said tape drive, along a tape threading path to said take-up reel, apparatus for regulating the threading and unthreading of said magnetic tape on said tape drive comprising:
   means for designating a plurality of concatenated segments, which concatenated segments represent said tape threading path;
   means for storing data indicative of the desired velocity of said magnetic tape along each of said plurality of concatenated segments of said tape threading path;
   means for measuring the actual velocity of said magnetic tape along each of said concatenated segments of said tape threading path;
   means for comparing said measured velocity of said magnetic tape with said stored data indicative of the desired velocity of said magnetic tape for each of said concatenated segments; and
   means for adjusting the actual velocity of said magnetic tape to equal said desired velocity for each of concatenated segments.

2. The apparatus of claim 1 wherein said adjusting means includes:
   tape threading arm motor connected to and driving said tape threading arm;
   means for controlling the speed of operation of said tape threading arm motor.

3. The apparatus of claim 2 wherein said controlling means includes:
   means for supplying a drive current to said tape threading arm motor to thereby regulate the speed of operation of said tape threading arm.

4. The apparatus of claim 3 wherein said controlling means further includes:
   means responsive to the difference between said measured magnetic tape velocity and said desired magnetic tape velocity for modifying said drive current by an amount proportional to said difference between said measured magnetic tape velocity and said desired magnetic tape velocity.

5. The apparatus of claim 2 wherein said storing means further includes:
   means for specifying a nominal drive current for said tape threading arm motor.

6. The apparatus of claim 1 wherein said measuring means includes:

means connected to said file reel for generating a signal indicative of the rotation of said file reel.

7. The apparatus of claim 6 wherein said measuring means further includes:
means responsive to said rotation signal and a clock signal for calculating the actual velocity of said magnetic tape.

8. A method of regulating the threading and unthreading of a magnetic tape in a tape drive having a take-up reel and a tape threading arm that transports a leader block, that is connected to magnetic tape from a magnetic tape file reel inserted into said tape drive, along a tape threading path to said take-up reel, said method comprising the steps of:
designating a plurality of concatenated segments which concatenated segments represent said tape threading path;
storing data indicative of the desired velocity of said magnetic tape along each of said concatenated segments of said tape threading path;
measuring the actual velocity of said magnetic tape along each of said concatenated segments of said tape threading path;
comparing said measured velocity of said magnetic tape with said stored data indicative of the desired velocity of said magnetic tape for each of said concatenated segments; and
adjusting the actual velocity of said magnetic tape to equal said desired velocity for each of the concatenated segments.

9. The method of claim 8 wherein said tape threading arm is connected to and driven by a tape threading arm motor, said step of adjusting includes the step of:
controlling the speed of operation of said tape threading arm motor.

10. The method of claim 9 wherein said step of controlling includes the step of:
supplying a drive current to said tape threading arm motor to regulate the speed of operation of said tape threading arm.

11. The method of claim 10 wherein said step of controlling further includes the step of:
modifying said drive current by an amount proportional to the difference between said measured magnetic tape velocity and said desired magnetic tape velocity.

12. The method of claim 9 wherein said step of storing further includes the step of:
specifying a nominal drive current for said tape threading arm motor.

13. The method of claim 8 wherein said step of measuring includes the step of:
generating a signal indicative of the rotation of said file reel.

14. The method of claim 13 wherein said step of measuring further includes the step of:
calculating the actual velocity of said magnetic tape using said rotation signal and a clock signal.

15. In a tape drive having a take-up reel and a tape threading arm that transports a leader block, that is connected to magnetic tape from a magnetic tape file reel inserted into said tape drive, along a tape threading path to said take-up reel, apparatus for regulating the threading and unthreading of said magnetic tape on said tape drive comprising:
tape threading arm motor, rotatable at a controllable speed, connected to and driving said tape threading arm;
means for designating a plurality of concatenated segments which concatenated segments represent said tape threading path;
means for storing data indicative of the desired velocity of said magnetic tape along each of said concatenated segments of said tape threading path;
means for measuring the actual velocity of said magnetic tape along each of said concatenated segments of said tape threading path;
means for comparing said measured velocity with said desired velocity for each of said concatenated segments; and
means for adjusting the speed of rotation of said tape threading arm motor to make said actual velocity of said magnetic tape equal to said desired velocity for each of the concatenated segments.

16. The apparatus of claim 15 wherein said adjusting means includes:
means for supplying a drive current to said tape threading arm motor.

17. The apparatus of claim 16 wherein said adjusting means further includes:
means responsive to the difference between said measured magnetic tape velocity and said desired magnetic tape velocity for modifying said drive current by an amount proportional to said difference between said measured magnetic tape velocity and said desired magnetic tape velocity.

18. The apparatus of claim 15 wherein said storing means further includes:
means for specifying a nominal drive current for said tape threading arm motor.

19. The apparatus of claim 15 wherein said measuring means includes:
means connected to said file reel for generating a signal indicative of the rotation of said file reel.

20. The apparatus of claim 19 wherein said measuring means further includes:
means responsive to said rotation signal and a clock signal for calculating the actual velocity of said magnetic tape.

21. A method of regulating the threading and unthreading of a magnetic tape in a tape drive having a take-up reel and a tape threading arm that transports a leader block, that is connected to magnetic tape from a magnetic tape file reel inserted into said tape drive, along a tape threading path to said take-up reel, said method comprising the steps of:
designating a plurality of concatenated segments which concatenated segments represents said tape threading path;
storing data indicative of the desired velocity of said magnetic tape along each of said concatenated segments of said tape threading path;
measuring the actual velocity of said magnetic tape along each of said concatenated segments of said tape threading path;
comparing said measured velocity with said desired velocity for each of the concatenated segments; and
adjusting the speed of operation of said tape threading arm to make the actual velocity of said magnetic tape equal to said desired velocity for each of the concatenated segments.

22. The method of claim 21 wherein said tape threading arm is connected to and driven by a tape threading arm motor, step of adjusting includes the step of:

supplying a drive current to said tape threading arm motor.

23. The method of claim 22 wherein said step of adjusting further includes the step of:
modifying said drive current by an amount proportional to the difference between said measured magnetic tape velocity and said desired magnetic tape velocity.

24. The method of claim 22 wherein said step of storing further includes the step of:
specifying a nominal drive current for said tape threading arm motor.

25. The method of claim 21 wherein said step of measuring includes the step of:
generating a signal indicative of the rotation of said file reel.

26. The method of claim 25 wherein said step of measuring further includes the step of:
calculating the actual velocity of said magnetic tape using said rotation signal and a clock signal.

27. In a tape drive having a take-up reel and a tape threading arm movable at a controllable speed of operation to transport a leader block, that is connected to magnetic tape from a magnetic tape file reel inserted into said tape drive, along a tape threading path to said take-up reel, apparatus for regulating the threading and unthreading of said magnetic tape on said tape drive comprising:
means for designating a plurality of concatenated segments, which concatenated segments represents said tape threading path;
means for storing data indicative of the desired velocity of said magnetic tape along each of said concatenated segments of said tape threading path;
means for measuring the actual velocity of said magnetic tape along each of said concatenated segments of said tape threading path;
means for adjusting said speed of operation of said tape threading arm and said file reel to make said actual velocity of said magnetic tape equal to said desired velocity for each of the concatenated segments.

28. The apparatus of claim 27 wherein said adjusting means includes:
tape threading arm motor connected to and driving said tape threading arm; and
means for supplying a drive current to said tape threading arm motor.

29. The apparatus of claim 28 wherein said adjusting means further includes:
means responsive to the difference between said measured magnetic tape velocity and said desired magnetic tape velocity for modifying said drive current by an amount proportional to said difference between said measured magnetic tape velocity and said desired magnetic tape velocity.

30. The apparatus of claim 27 wherein said adjusting means includes:
means for supplying a drive current to a magnetic tape file reel motor that is connected to and drives said magnetic tape file reel.

31. The apparatus of claim 30 wherein said adjusting means further includes:
means responsive to the difference between said measured magnetic tape velocity and said desired magnetic tape velocity for modifying said drive current by an amount proportional to said difference between said measured magnetic tape velocity and said desired magnetic tape velocity.

32. A method of regulating the threading and unthreading of a magnetic tape in a tape drive having a take-up reel and a tape threading arm each having a controllable speed of operation to transport a leader block that is connected to magnetic tape from a magnetic tape file reel inserted into said tape drive, along a tape threading path to said take-up reel, said method comprising:
designating a plurality of concatenated segments, which concatenated segments represent said tape threading path;
storing data indicative of the desired velocity of said magnetic tape along each of said concatenated segments of said tape threading path;
measuring the actual velocity of said magnetic tape along each of said concatenated segments of said tape threading path;
adjusting the speed of operation of said tape threading arm and said file reel to make said actual velocity of said magnetic tape equal to said desired velocity for each of the concatenated segments.

33. The method of claim 32 wherein said tape threading arm is connected to and driven by a tape threading arm motor, said step of adjusting includes the step of:
supplying a drive current to said tape threading arm motor.

34. The method of claim 33 wherein said step of adjusting further includes the step of:
modifying said drive current by an amount proportional to the difference between said measured magnetic tape velocity and said desired magnetic tape velocity.

35. The method of claim 32 wherein said step of adjusting includes the step of:
supplying a drive current to a magnetic tape file reel motor that is connected to and drives said magnetic tape file reel.

36. The method of claim 35 wherein said step of adjusting further includes the step of:
modifying said drive current by an amount proportional to the difference between said measured magnetic tape velocity and said desired magnetic tape velocity.

37. In a tape drive having a take-up reel and a tape threading arm each having a controllable speed of operation to transport a leader block, that is connected to magnetic tape from a magnetic tape file reel inserted into said tape drive, along a tape threading path to said take-up reel, apparatus for regulating the threading and unthreading of said magnetic tape on said tape drive comprising:
means for storing data indicative of the desired velocity of said magnetic tape along said tape threading path, including:
means for designating a plurality of concatenated segments, which concatenated segments represent said tape threading path;
means for specifying a desired magnetic tape velocity for each of said plurality of concatenated segments of said tape threading path;
means for specifying a nominal drive current for a tape threading arm motor that is connected to and drives said tape threading arm for each of said concatenated segments of said tape threading path;

means for measuring the actual velocity of said magnetic tape along each of said concatenated segments of said tape threading path, including:
  means connected to said file reel for generating a signal indicative of the rotation of said file reel;
  means responsive to said rotation signal and a clock signal for calculating the actual velocity of said magnetic tape along each of said concatenated segments of said tape threading path;
means for controlling the speed of operation of said tape threading arm to make the actual velocity of said magnetic tape to equal said desired velocity for each of said concatenated segments of said tape threading path, including:
  means for supplying a drive current to a tape threading arm motor that is connected to and drives said tape threading arm;
  means responsive to the difference between said measured magnetic tape velocity and said desired magnetic tape velocity for each of said concatenated segments of said tape threading path for modifying said drive current by an amount proportional to said difference between said measured magnetic tape velocity and said desired magnetic tape velocity.

* * * * *